US008312562B2

(12) United States Patent
Hammons et al.

(10) Patent No.: US 8,312,562 B2
(45) Date of Patent: *Nov. 20, 2012

(54) IMPACT AND/OR VIBRATION ABSORBENT MATERIAL AND PROTECTIVE ARTICLES MAKING USE THEREOF

(75) Inventors: Gary Hammons, Richwood, OH (US); Roger W. Kramer, Springfield, OH (US); Charles Marks, Springfield, OH (US); Kevin Porter, Marysville, OH (US); Robert Bogard, Columbus, OH (US); Traci Skahill, Hilliard, OH (US); Mark Smith, Marion, OH (US)

(73) Assignee: Honda Motor Co., Ltd., Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 12/715,263

(22) Filed: Mar. 1, 2010

(65) Prior Publication Data
US 2010/0154106 A1 Jun. 24, 2010

Related U.S. Application Data

(60) Division of application No. 11/277,001, filed on Mar. 20, 2006, now Pat. No. 7,669,251, which is a continuation-in-part of application No. 11/084,906, filed on Mar. 21, 2005, now Pat. No. 7,254,840.

(51) Int. Cl.
*A41D 19/00* (2006.01)
(52) U.S. Cl. .......................................................... 2/16
(58) Field of Classification Search ................... 2/16, 20, 2/21, 161.1; 428/137, 217, 316.6
See application file for complete search history.

(56) References Cited

U.S. PATENT DOCUMENTS

| 2,723,214 A | 11/1955 | Meyer |
| 3,813,281 A | 5/1974 | Burgess et al. |
| 4,042,975 A | 8/1977 | Elliott, Jr. et al. |
| 4,471,538 A | 9/1984 | Pomeranz et al. |
| 4,570,269 A | 2/1986 | Berlese |
| 4,825,565 A | 5/1989 | Bigolin |
| 5,168,576 A | 12/1992 | Krent et al. |
| 5,274,846 A | 1/1994 | Kolsky |
| 5,632,045 A | 5/1997 | Chase et al. |
| 5,640,712 A | 6/1997 | Hansen et al. |

(Continued)

FOREIGN PATENT DOCUMENTS
DE 3530397 A1 3/1987
(Continued)

*Primary Examiner* — Katherine Moran
(74) *Attorney, Agent, or Firm* — Standley Law Group LLP

(57) ABSTRACT

An impact and/or vibration absorbent material and protective articles making use of said material. An impact and/or vibration absorbent material of the present invention has at least two material layers. The individual layers of the impact and/or vibration absorbent material may be of different materials, or of the same material with the composition of the material of one layer adjusted to be of dissimilar hardness to an adjacent layer. Each material layer preferably contains a number of holes. The holes in one layer are located and arranged to be offset from the holes in an adjacent layer. The combination of material properties and the inclusion and arrangement of holes renders such a material highly impact and/or vibration absorbent. Through use of a protective article of the present invention, the effects of impact and/or vibration forces on a user of the protective article can be minimized.

20 Claims, 12 Drawing Sheets

U.S. PATENT DOCUMENTS

| | | |
|---|---|---|
| 5,673,437 A | 10/1997 | Chase et al. |
| 5,753,061 A | 5/1998 | Rudy |
| 5,830,553 A | 11/1998 | Huang |
| 5,840,397 A | 11/1998 | Landi et al. |
| 5,898,938 A | 5/1999 | Baylor et al. |
| 5,916,664 A | 6/1999 | Rudy |
| 6,131,196 A | 10/2000 | Vallion |
| 6,275,996 B1 | 8/2001 | Redwood et al. |
| 6,319,599 B1 | 11/2001 | Buckley |
| 6,341,376 B1 | 1/2002 | Smerdon, Jr. |
| 6,374,514 B1 | 4/2002 | Swigart |
| 6,402,879 B1 | 6/2002 | Tawney et al. |
| 6,405,456 B1 | 6/2002 | Nichelson |
| 6,571,490 B2 | 6/2003 | Tawney et al. |
| 6,701,529 B1 | 3/2004 | Rhoades et al. |
| 6,720,069 B1 * | 4/2004 | Murakami et al. ......... 428/319.3 |
| 6,723,401 B1 | 4/2004 | McKnight et al. |
| 6,811,463 B2 | 11/2004 | Martz |
| 7,171,696 B2 | 2/2007 | Falone et al. |
| 7,171,697 B2 | 2/2007 | Vito et al. |
| 7,219,531 B2 | 5/2007 | Hammons et al. |
| 7,254,840 B2 * | 8/2007 | Hammons et al. ................... 2/16 |
| 2004/0020079 A1 | 2/2004 | Klavano |
| 2004/0191446 A1 | 9/2004 | Kriesel |
| 2004/0194344 A1 | 10/2004 | Tadin |
| 2006/0168706 A1 | 8/2006 | Auger et al. |
| 2006/0206980 A1 | 9/2006 | Hammons et al. |
| 2006/0280906 A1 | 12/2006 | Trentacosta et al. |

FOREIGN PATENT DOCUMENTS

| | | |
|---|---|---|
| JP | 52-15690 U | 2/1977 |
| JP | 1-119018 U | 8/1989 |
| JP | 6-504689 A | 6/1994 |
| JP | 9-504970 A | 5/1997 |
| JP | 11-500809 A | 1/1999 |
| JP | 2000-84138 A | 3/2000 |
| JP | 2000-199106 A | 7/2000 |
| JP | 2001-336007 A | 12/2001 |
| JP | 2005-46449 A | 2/2005 |
| WO | 96/15388 A1 | 5/1996 |

* cited by examiner

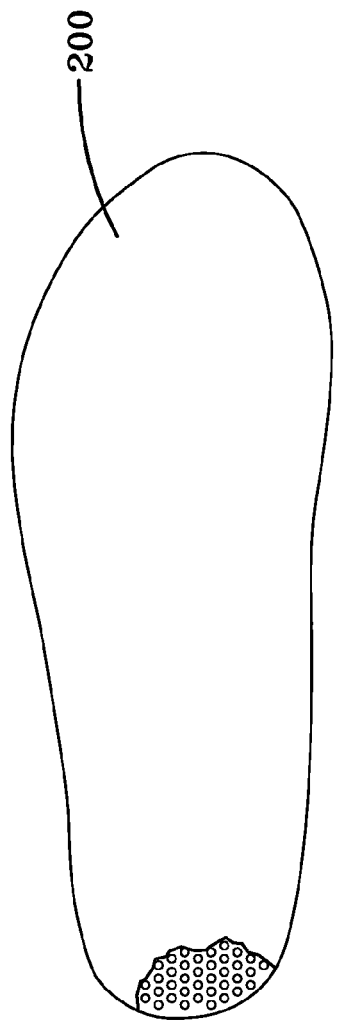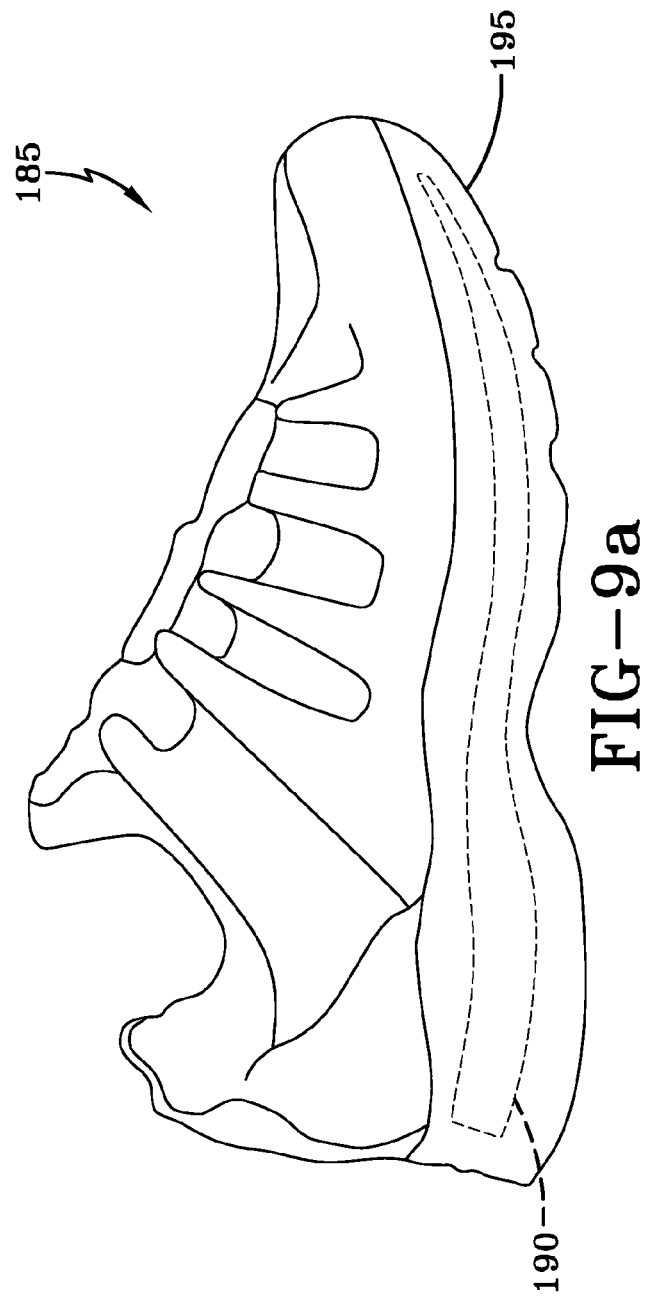
FIG-9b
FIG-9a

IMPACT AND/OR VIBRATION ABSORBENT MATERIAL AND PROTECTIVE ARTICLES MAKING USE THEREOF

This application is a divisional of U.S. patent application Ser. No. 11/277,001, which was filed on Mar. 20, 2006 and issues on Mar. 2, 2010 as U.S. Pat. No. 7,669,251, which is a continuation-in-part of U.S. patent application Ser. No. 11/084,906, which was filed on Mar. 31, 2005 and issued on Aug. 14, 2007 as U.S. Pat. No. 7,254,840, both of which are expressly incorporated herein by reference.

BACKGROUND OF THE INVENTION

The present invention is directed to an impact and/or vibration absorbent material and to various impact and/or vibration protective articles that incorporate such a material. A testing apparatus that is particularly well-suited for determining the impact force absorption characteristics of such a material is also disclosed.

Exposure of the human body to repeated impact and/or vibration is a known problem. Such exposure can occur in various settings: both occupational and recreational.

It is known, for example, that extended exposure of the human body to vibration can lead to vascular, neurological and musculoskeletal disorders. The source of such vibration is commonly some type of mechanical device, such as a hand-held vibrating tool. In the case of exposure to hand-held vibrating tools, resultant disorders typically manifest in the body's upper limbs—such as in the form of carpal tunnel syndrome, for example.

Similar problems may also result from repeatedly impacting an object with the hand. There are many situations, particularly occupational situations, where a person's hand is effectively used as a tool to impact another object. For example, in certain automotive manufacturing operations, the hand can frequently be used to install fasteners or to set the position of one assembly component to another. In such a situation, it is desirable to transmit as much of the hand-generated impact force as possible to the impacted object, while simultaneously protecting the hand from impact related injuries.

Also problematic is what may be referred to as whole-body vibration, such as may be transmitted through the seat of an industrial vehicle. A multiplicity of vehicles may transmit such vibration: from large outdoor earth-moving equipment to commonly used forklifts and tow motors, for example. Rather than causing a problem with a particular limb or limbs, however, whole body vibration commonly results in spinal system disorders.

The human body, or particular portions thereof, may also be exposed to undesirable impact and/or vibration in a recreational setting. For example, it is known that long term participation in certain racquet sports may lead to similar problems. Interestingly, it has also been found that such problems may plague cyclists due to the persistent pressure put on the nerves of the hand by the handlebars of a bicycle (or motorcycle), as well as the transmission of shock and vibration therethrough. Certainly, a person's shoes can also transmit shock and/or vibration to the feet during walking, running, hiking, climbing, or other activities.

Various types of protective equipment have been produced in an effort to combat the aforementioned problems. Of particular interest are gloves that have been designed to reduce the amount of impact and/or vibration force transmitted to the hand when using devices such as hand-held power (vibrating) tools, or when using the hand as an impact tool. Other articles have also been developed in this pursuit, including, for example, shoe soles and shoe inserts. These articles may make use of different material compositions, multiple air bladders, and/or various other designs and techniques to achieve a reduction in impact and/or vibration transmission.

However, Applicants have discovered that, at least with respect to hand protection, each of the known products still transmits a significant amount of impact and/or vibration to the wearer's hand. Consequently, any improvement in impact and/or vibration absorbent hand protection is highly desirable. An impact and/or vibration absorbent material of the present invention and a protective impact glove made therefrom can provide such improvements.

SUMMARY OF THE INVENTION

The present invention is directed to an impact and/or vibration absorbent material that can be used in a variety of protective equipment and apparel (articles)—particularly gloves. Although an impact and/or vibration absorbent material of the present invention is particularly well-suited for use in protective gloves, it should also be realized that said material may also find use in many other articles such as, for example, shoe soles, shoe insoles, sporting equipment, seat cushions, head rests, and a variety of other body protective devices and apparel. It should be further understood that the term "protective article," as used herein, refers not only to articles specifically designed to reduce or eliminate impact and/or vibration induced injuries, but also to articles that simply make exposure to such forces more comfortable.

An impact and/or vibration absorbent material of the present invention is preferably comprised of a layered composition of one or more materials. For example, one such two layer material includes a first layer of a flexible polymeric material in abutment with a second layer of a closed-cell foam material. In another embodiment, a first layer of a flexible polymeric material is used in conjunction with a second layer of a specialized bubble pack-type material. Other material combinations may be used in other embodiments. In at least certain embodiments, however, it is preferred that the material forming the first layer have a hardness less than that of the material forming the second layer.

No matter the particular materials used to form the impact and/or vibration absorbent material, however, a plurality of holes are provided in at least certain ones of and, preferably, all the layers thereof. For example, in the polymer/closed-cell foam composition mentioned above, each layer of material is provided with a plurality of holes. The size, shape and number of holes may vary. However, the holes are preferably located in each layer so that when the layers are properly assembled, the holes in one layer will be offset from the holes in the other layer. When more than two layers of material are used, each layer is provided with holes that are offset with respect to the layer(s) adjacent thereto. Preferably, the holes are thru-holes that extend completely through each respective material.

It has been discovered that this use and arrangement of holes improves the ability of a material of the present invention to absorb impact and/or vibration. It has also been determined that through the proper selection of materials and the use of the offset thru-holes, the amount of impact force transferred to an object by a protective glove-covered hand can be significantly increased without increasing the amount of impact force imparted to the hand.

The impact and/or vibration absorption abilities of a material of the present invention are believed to be improved in part by the offset hole pattern—which allows for increased material deflection. More specifically, when a material of the present invention is subjected to an impact and/or vibration force, the presence of the holes and their offset arrangement provides an additional dimension (direction) of deflection for the material surrounding the area of impact. For example, when a two layer material of the present invention is subjected to an impact and/or vibration force, the force can be absorbed/dissipated not only by a general deformation of one or both materials and a deflection of portions of one both materials into holes located respectively therein, but also by deflection of the inner layer of material into holes in the adjacent outer layer. The offset hole pattern increases the open surface area into which the material(s) can be deflected—thereby allowing for increased absorption properties.

A material of the present invention has also been shown to impart an additional benefit when the material is employed with an article, such as a protective impact glove, that is used by a wearer to deliver an impact force to another object. More specifically, as will be described in more detail below, the ability of an inner layer of material to deflect into holes in an outer layer of material permits more of the impact force generated by the hand to be delivered to the object; without increasing (or actually decreasing) the amount of impact force experienced by the hand.

In contrast, known impact absorbent materials lack the ability to dissipate and absorb forces in this manner. Even if such materials are provided with collapsible cavities, for example, they lack the ability of a material of the present invention to also deflect into holes residing in an adjacent material layer(s) when subjected to an impact and/or vibration force. Rather, known materials are required to dissipate impact and/or vibration forces purely through the expansion/deformation of the solid material, or through transverse-only deflection of the material into cavities, if such are provided. Therefore, these known materials are also incapable of increasing the impact force transfer rate when used in an item such as a protective impact glove. Consequently, as can be understood from the foregoing description, an impact and/or vibration absorbent material of the present invention, and various articles making use thereof, can provide for impact and/or vibration protection/transfer that is superior to that of known materials and articles made therewith.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 9a and 9b illustrate a shoe and shoe insole, respectively, each incorporating an impact and/or vibration absorbent material of the present invention;

DETAILED DESCRIPTION OF THE EXEMPLARY EMBODIMENT(S)

Figure 1:
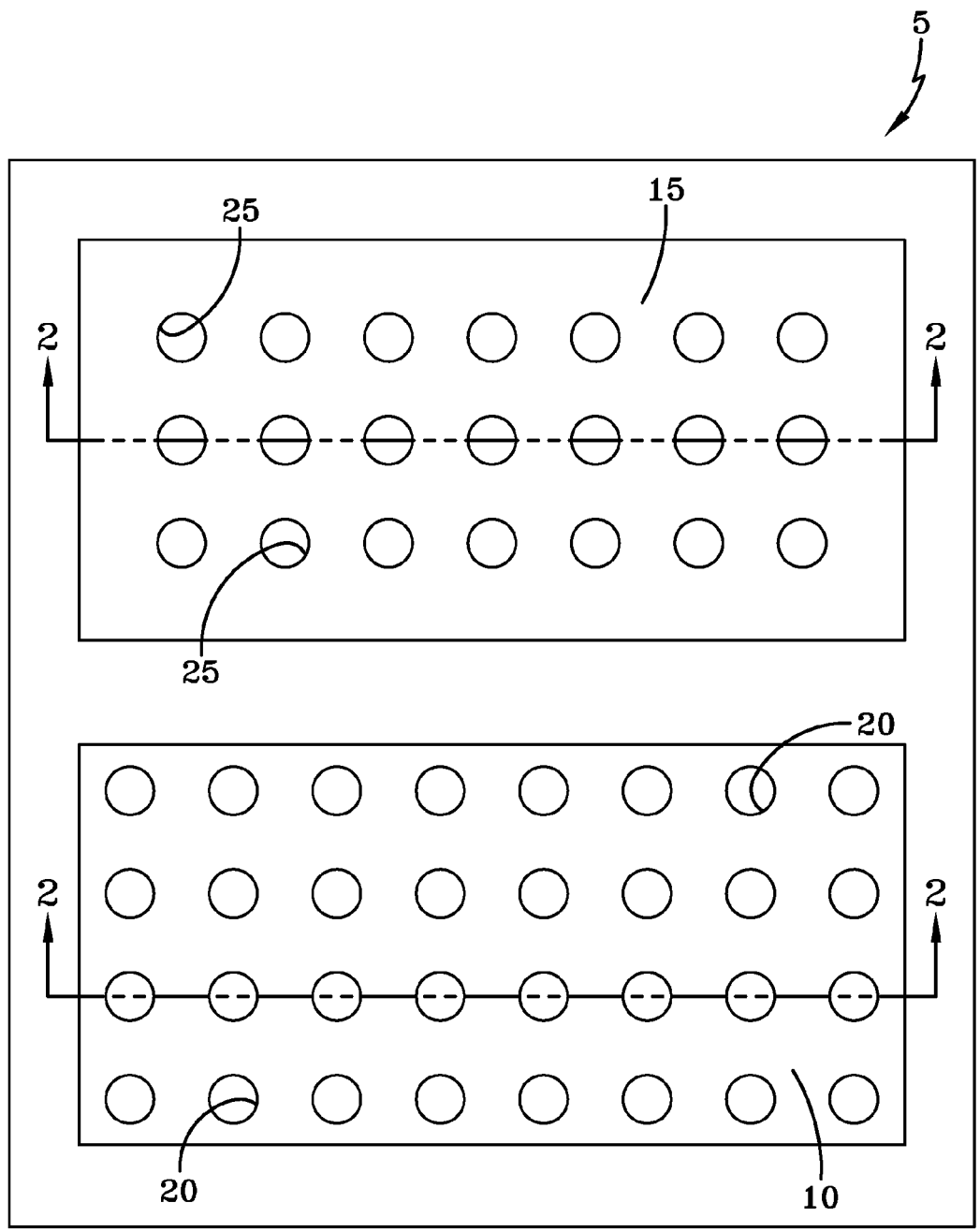
FIG. 1 shows a top plan view of each of two separate material layers that will be placed in contact to form an exemplary impact and/or vibration absorbent material of the present invention.
Figure 2:
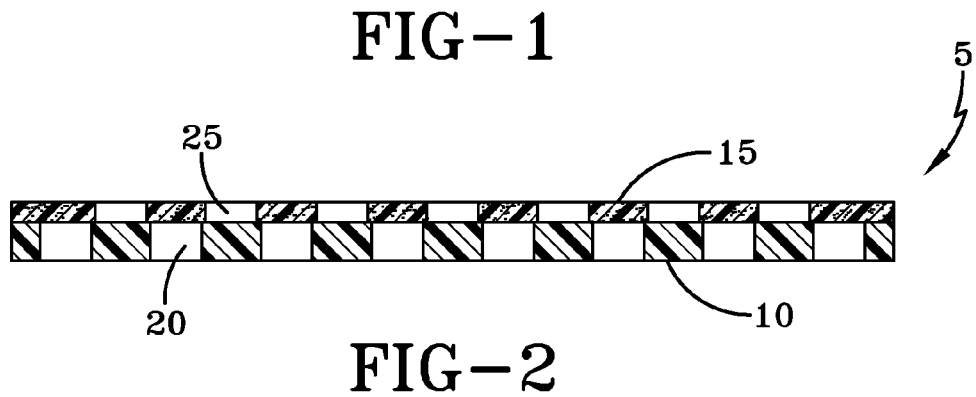
FIG. 2 is a side elevational view, in cross-section, showing the material layers of FIG. 1 after being assembled.

One embodiment of an impact and/or vibration absorbent material 5 of the present invention can be observed by reference to FIGS. 1-2. As can be seen in FIG. 1, two separate material layers 10, 15 are included in this particular material. The first (inner) layer 10 may be constructed from a number of flexible materials, such as polymeric materials and polymeric gel materials. Suitable materials may comprise, without limitation, silicone, urethane, and various other elastomers and thermoplastic elastomers. In this particular embodiment, the inner layer 10 of the impact and/or vibration absorbent material 5 is manufactured from a polymeric gel. Such a gel may be comprised of a block copolymer material, such as one of the family of block copolymer materials available from Kraton Polymers under the tradename of Kraton®. Of course, a number of other suitable materials are also available, and such would be known to those skilled in the art. Such materials are considered well-suited to use in the present invention due to, among other things, their flexibility, softness, deformability, and impact and/or vibration absorbent properties. Whatever particular material is selected for the inner layer, however, it is preferred that such material exhibit a minimal propensity to stick to itself.

The second (outer) layer 15 may also be constructed from a number of different materials. For example, it has been found that closed-cell foam materials such as, for example, Neoprene® perform very well when used to construct the outer layer 15. A number of other rubber, plastic and/or polymeric materials may also be used to construct the outer layer 15. In any event, it is preferred that the material of the outer layer 15 have a hardness that is greater than the hardness of the material of the inner layer 10 (for reasons described in more detail below). While many harder materials (e.g., PVC) may be used to form the outer layer 15, it has been found that the use of a somewhat more flexible closed-cell foam material, such as Neoprene®, allows the outer layer 15 to contribute to the overall impact and/or vibration absorbing characteristics of the material to a greater extent than would be possible with a considerably harder material.

As shown, each of the first layer 10 and the second layer 15 is provided with a plurality of holes 20, 25. Preferably, as can be best observed by reference to FIG. 2, the holes 20, 25 pass fully through each material layer 10, 15.

The holes 20, 25 may be of virtually any size and shape. The size and shape of the holes 20, 25 may be altered as necessary to produce the desired amount of impact and/or vibration resistance. As with hole size and shape, the number of holes 20, 25 provided may also vary according to the particular application.

As can be seen in FIGS. 1-2, the holes 20, 25 are preferably located such that the holes in one layer 10 will be offset from the holes in the other layer 15 after the two layers have been properly assembled to one another. In this particular example, the offset of the holes 20, 25 is shown to be such that a row of holes in one layer lies substantially equidistant between corresponding rows of holes in the other layer. However, while preferable, such an arrangement is not considered essential to the functioning of the present invention. For example, a row of holes in one layer may be biased toward a row of holes in an adjacent layer, rather than residing substantially in the middle of the space therebetween. The holes in each layer may even be located such that there is a slight overlap of at least some of the holes after the layers are assembled.

Although the holes 20, 25 are shown in FIG. 1 to be arranged in substantially equidistant rows, this too is optional. The holes 20, 25 in FIG. 1 are shown in this manner purely for simplicity of illustration, and because the exemplary material layers 10, 15 are shown to be of random size and shape. When an impact and/or vibration absorbent material composition of the present invention is to be used in a specific application, such as in a protective impact glove, both the size and shape of the material layers, and the size, shape, number and arrangement of the holes may be altered as desired.

Figure 3:
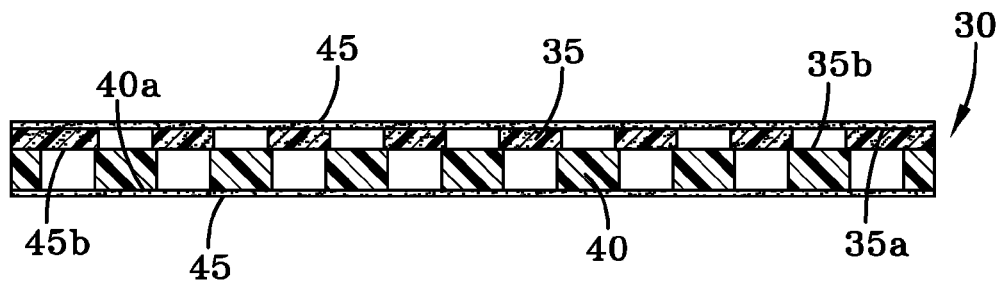
FIG. 3 depicts an alternate embodiment of an impact and/or vibration absorbent material of the present invention, wherein an exposed major surface of each material layer shown in FIG. 2 is covered with a stretchable fabric.

An alternate embodiment of an impact and/or vibration absorbent material 30 of the present invention is illustrated in FIG. 3. This embodiment of the impact and/or vibration absorbent material 30 is similar to the material of FIGS. 1-2, however, in this particular embodiment a thin layer of a stretchable fabric 45 covers one or both of the exposed major surfaces 35a, 40a of the inner and outer layers 35, 40. The stretchable fabric 45 can facilitate installation of an impact and/or vibration absorbent material of the present invention into a protective article such as, for example, a glove. The stretchable fabric 45 is selected such that it does not impede the ability of either material layer 35, 40 to deform and/or otherwise absorb impact and/or vibration. Acceptable stretchable fabrics may include, without limitation, various stretchable nylon and Neoprene® fabrics, as well as spandex-type materials such as Lycra®. Numerous other stretchable fabrics may also be used in this manner. When such a material is used in the present invention, the holes in the impact and/or vibration absorbent material layers may pass through the fabric (as shown in FIG. 3) or, alternatively, the fabric may span the holes. In a modification of this embodiment (not shown), such a fabric may also cover the abutting major surfaces 35b, 45b of each layer 35, 40.

Figure 4:
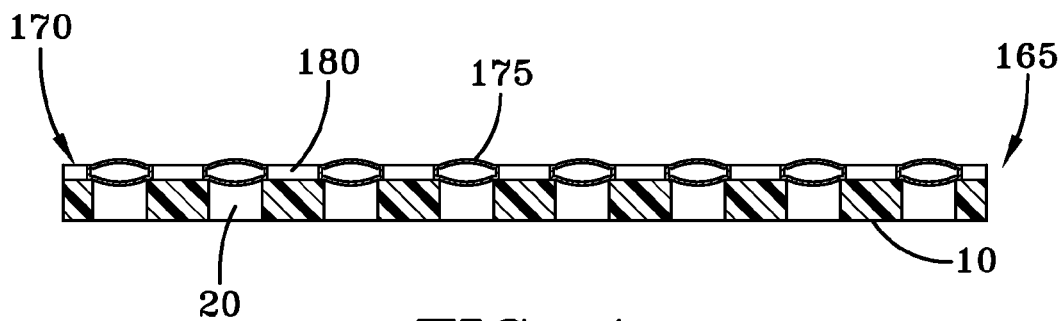
FIG. 4 illustrates yet another embodiment of an impact and/or vibration absorbent material of the present invention, wherein one of the material layers shown in FIGS. 1-2 is combined with a specialized bubble pack material.

Yet another exemplary embodiment of an impact and/or vibration absorbent material 165 of the present invention is illustrated in FIG. 4. This embodiment of the impact and/or vibration absorbent material 165 is also similar to the material 5 of FIGS. 1-2. In this particular embodiment, however, the second layer 15 of the material 5 of FIGS. 1-2 has been replaced with a layer of a bubble pack-type material 170 having a plurality of inflated air pockets 175.

Like the corresponding material layers represented in FIGS. 1-3, the bubble pack-type material layer 170 is also provided with a plurality of holes 180. Preferably, the holes 180 pass fully through the bubble pack-type material layer 170. Again, the holes 180 may be of virtually any size and shape, and the size and shape of the holes may be altered as necessary to produce the desired amount of impact and/or vibration resistance. As with hole size and shape, the number of holes 180 provided may also vary according to the particular application.

As can be seen in FIG. 4, the holes 180 in the bubble pack-type material layer 170 are preferably located so as to be offset from the holes in the polymeric material layer 10 after the two layers have been properly assembled to one another. In this particular example, the offset of the holes 20, 180 is shown to be such that a row of holes in one layer lies substantially equidistant between corresponding rows of holes in the other layer. However, while preferable, such an arrangement is not considered essential to the functioning of this embodiment of the present invention. For example, the holes may be alternatively arranged as described above with reference to FIGS. 1-2.

It is contemplated that this particular embodiment of an impact and/or vibration absorbent material 165 of the present invention can be used in virtually any application in which the impact and/or vibration absorbent materials 5, 30 of FIGS. 1-3 may be used. However, it is also realized that this particular embodiment of an impact and/or vibration absorbent material 165 of the present invention may be especially well-suited to applications where vibration absorption is of most importance.

Figure 6:
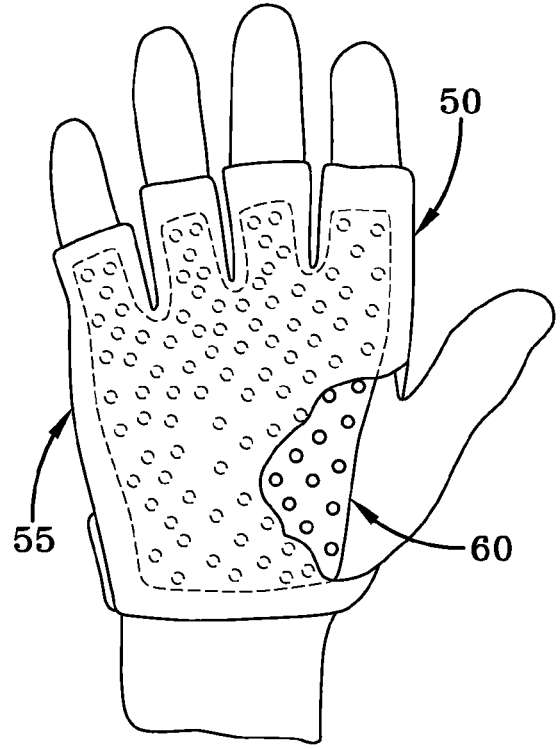
FIG. 6 depicts, in partial cut-away, the glove insert of FIG. 5 being used in one embodiment of a protective impact glove of the present invention.

One embodiment of a protective impact glove 50 that incorporates an impact and/or vibration absorbent material of the present invention is shown in FIG. 6. This particular protective glove 50 is designed to expose a portion of each of the four fingers of the hand H, and offers no protection for the thumb. However, this glove 50 is provided for the purpose of illustration only, and in no way limits the scope of the present invention to such a design. As one skilled in the art would readily understand, there are a multitude of glove designs that would fall within the scope of the present invention. As such, a protective impact glove of the present invention may be fingered or fingerless, and may have a body portion (shell) constructed from a wide variety of materials including, for example, leather, vinyl, fabric, various composites, and/or virtually any other material from which gloves are currently manufactured or may be manufactured in the future.

Figure 5:
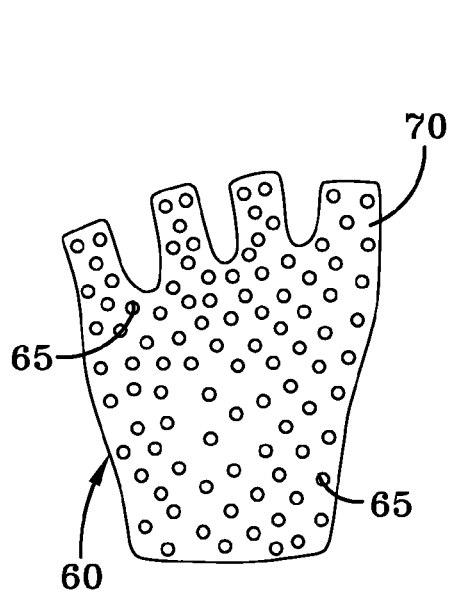
FIG. 5 is a top plan view of an exemplary impact and/or vibration absorbent glove insert of the present invention.

An impact and/or vibration absorbent insert 60 according to the present invention is shown to be installed within the glove 50 in FIG. 6, and can be seen in its entirety by reference to FIG. 5. The insert 60 may be constructed from an impact and/or vibration absorbent material 70 that is the same or similar to the material shown in FIGS. 1-3, for example. Alternatively, the insert 60 may be constructed from another impact and/or vibration absorbent material in accordance with the present invention that is not specifically shown in the drawing figures.

As can be observed in FIG. 5, this particular impact and/or vibration absorbent insert 60 is shaped for installation to a body portion (shell) 55 of the protective glove 50 depicted in FIG. 6 and, therefore, also covers only a portion of the hand H.

Of course, as can be understood, such an insert could also be of various other size and shape to conform to the particular glove body with which it will be used.

In an insert 60 like that shown in FIGS. 5-6, the holes 65 in the impact and/or vibration absorbent material 70 may be provided in the offset pattern described previously, and distributed substantially uniformly throughout the material. Alternatively, it is possible to distribute the holes 65 in a non-uniform manner. For example, certain areas of the insert 60 may contain holes of different size and/or a greater or lesser concentration of holes in order to alter the amount of impact and/or vibration protection provided to corresponding areas of the hand H. It may also be desirable, and is possible, to design and construct certain areas of the insert 60 with no holes.

Although the insert 60 of FIGS. 5-6 is shown to be of one piece construction, it should also be realized that such an insert may be comprised of multiple components. For example, an insert (not shown) may include a palm protecting portion, as well as separate finger protecting portions. This may be especially useful when applied to a fingered glove. Further, although the glove 50 of FIG. 6 is only shown to include an insert 60 on its palm side, an insert could also be provided on the opposite side to protect the back portion of the hand H.

Each insert(s), or insert portion, may be permanently affixed to the glove 50, such as by sewing, bonding, or any other method that would be known to one skilled in the art. Additionally, certain of the materials useable in forming an impact and/or vibration absorbent material of the present invention may exhibit an adhesion to the glove body 55 that is sufficient to render further means of retainment unnecessary. It is possible to locate an insert interior to the glove body 55, in a pocket(s) within the glove body, in between layers of the glove body, or exterior to the glove body.

In another embodiment, the insert(s) may be removably affixed to the glove 50, such as by snaps, hook and loop fasteners (e.g., Velcro®), or other similar fastening mechanisms. In yet another embodiment, the insert(s) may be installed into a pocket(s) resident on the interior of the glove body 55. The embodiment of the impact and/or vibration absorbent material depicted in FIG. 3 may be especially well-suited to use in this latter-described embodiment of a protective impact glove, as the stretchable fabric outer covering 45 thereof can facilitate installation of the insert(s) into the pocket(s) by preventing the insert material from sticking to the pocket material.

Figure 7:
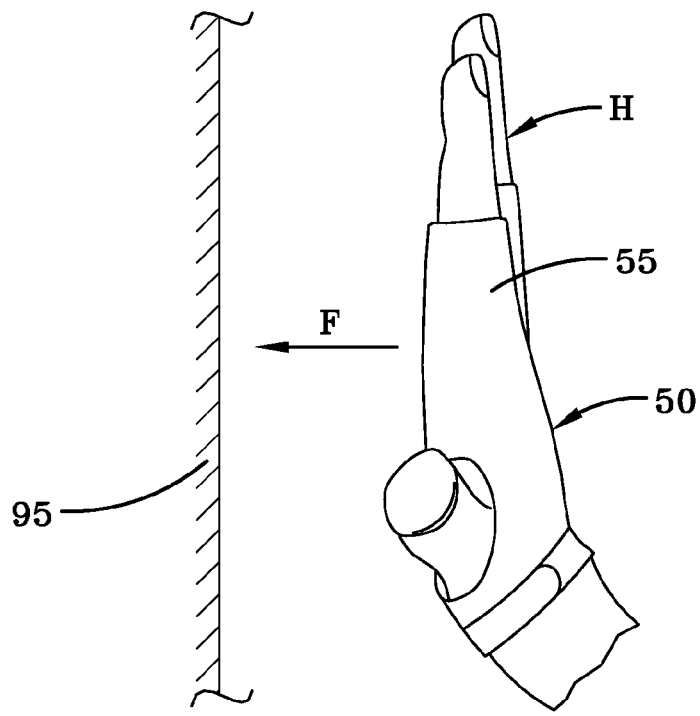
FIG. 7 shows the protective impact glove of FIG. 6 donned on a wearer's hand and being used in conjunction therewith to strike another object.
Figure 8A:
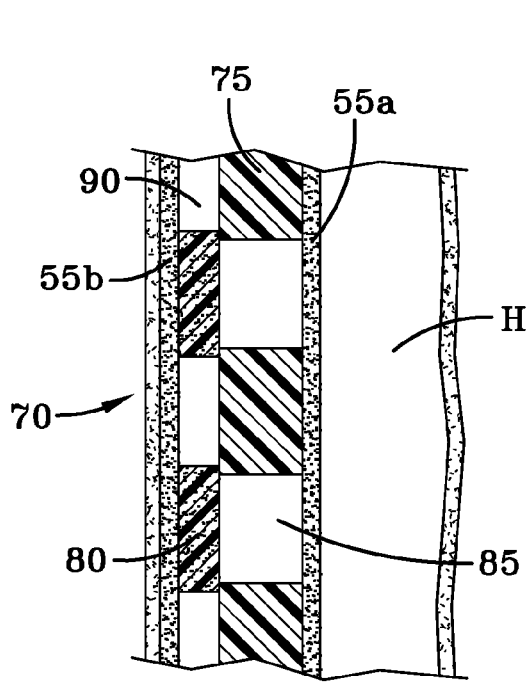
FIG. 8a is an enlarged view of a section of the protective impact glove of FIGS. 6-7, prior to being subjected to the impact force generated by striking the object shown in FIG. 7.
Figure 8B:
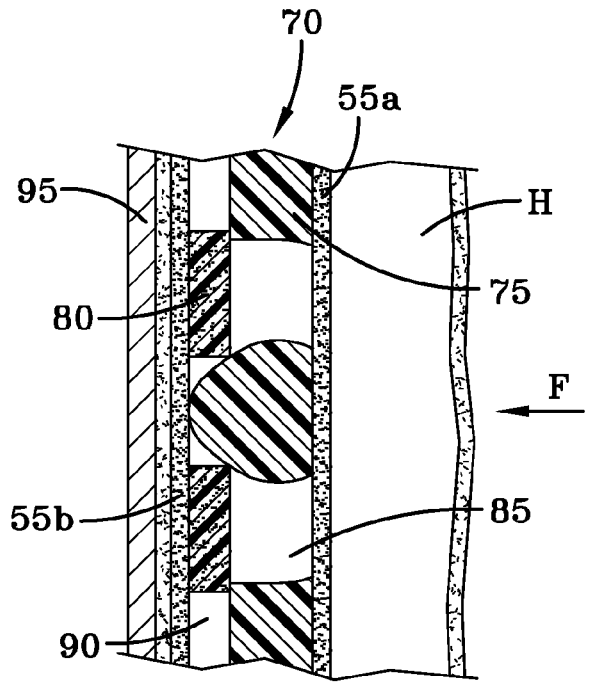
FIG. 8b depicts the section of the protective impact glove of FIG. 8a as it impacts the object shown in FIG. 7.

A better understanding of the aforementioned impact force transfer ability of an impact and/or vibration absorbent material of the present invention can be gained through a review of FIGS. 7 and 8a-8b and the following description. FIG. 7 again illustrates the protective impact glove 50 of FIG. 6 on a wearer's hand H. In FIG. 7, however, the glove-covered hand H is shown to be in motion and at a point just prior to striking another object 95. The object 95 may be virtually any object such as, for example, an automotive assembly component.

As can be seen in FIG. 7, the glove-covered hand H is moving from right to left toward the object 95, and will deliver an impact force F to the object. As this process may be repeated a great number of times each day in a manufacturing setting, it is desirable not only to minimize exposure of the hand to impact forces, but also to transfer as much of the impact force as possible from the gloved hand H to the object 95. More specifically, while known protective gloves may provide a user's hand with at least some impact protection during such use, the cushioning materials present therein typically redirect the impact energy in a manner that results in far less impact force being delivered to an object than is actually generated by the hand. Consequently, if a given amount of force must be exerted against an object by the hand during performance of a particular process, the use of such known gloves results in the wearer having to increase the impact energy of the blow (generally by increasing hand speed). Obviously, this is counterproductive to minimizing the amount of impact force to which the hand is exposed.

Unlike these known materials, a glove 50 incorporating an impact and/or vibration absorbent material of the present invention is able to minimize the amount of impact and/or vibration force to which the hand is exposed, while simultaneously transferring a maximum amount of energy from the hand H to the object 95 being impacted thereby. FIG. 8a is an enlarged view of a small section of the impact and/or vibration absorbent material insert 60 of the glove 50 prior to impacting the object 95. As can be seen, the impact and/or vibration absorbent material 70 forming the insert 60 is again comprised of an inner layer 75 and an outer layer 85, with the layers having offset holes 85, 90. In this particular embodiment of the glove 50, the insert 60 resides in a pocket formed between inner and intermediary layers 55a, 55b of the glove body 55.

FIG. 8b illustrates the state of the impact and/or vibration absorbent material 70 of the insert 60 at, or just after, impact of the glove-covered hand H with the object 95. As can be seen, the impact F is primarily dissipated through (absorbed by) the inner layer 75 of the material 70 via a general deformation thereof and/or a deflection of portions thereof into holes 85 located therein. When an impact and/or vibration absorbent material is also used to form the outer layer 80, the outer layer may also contribute to impact and/or vibration absorption in a similar manner. It is this absorption/dissipation mechanism that generally redirects impact and/or vibration energy around or otherwise away from the hand.

The enhanced impact force transfer ability of the impact and/or vibration absorbent material 70 can also be observed in FIG. 8b. As shown in this example, when the glove covered hand H strikes the object 95, the inner layer 55a of the glove body 55 comes in contact therewith. The object 95 substantially halts the forward motion of the hand H. However, because of the flexible/deformable characteristics of the inner material layer 75, the energy associated with said forward motion and the impact force F generated when the hand H strikes the object 95 causes a further forward displacement of at least a portion of the inner material layer. The holes 90 in the outer layer 80 facilitate this forward displacement by receiving forward deflecting portions of the inner material layer 75. This forward deflection of the inner material layer 75 into the holes 85 in the outer material layer 80 at impact, acts to transfer a greater amount of impact force to the object 95 than can known impact and/or vibration absorbent materials. This forward force transfer is accomplished while simultaneously minimizing the amount of impact force actually transferred to the hand H. Upon dissipation of the impact force F, the inner material layer 75 withdraws from the holes 90 in the outer layer 85.

With respect to the exemplary representation of FIG. 8b, it should be noted that the area over which the impact force deforms the material has been greatly reduced therein in order to better convey the operation mechanism of the material. More particularly, the impact force F has been shown to occur at substantially a single point when it would, in reality, be distributed over a much greater area. Consequently, the deformation of the material layer(s) 75, 85 would also occur over a much greater area—as would the forward deflection of the inner material layer 75 into the holes 90 in the outer layer 85.

Also, as can be understood, both the general deformation of the material layer(s) 75, 85 and the amount of forward deflection of the inner material layer 75 into the holes 90 in the outer layer 85 will be related to the amount of impact force generated. It should also be realized that, although not shown in FIG. 8b for reasons of clarity, an impact force F of sufficient magnitude may cause a change in shape of the outer material layer 85, as well.

Various other impact and/or vibration protective articles are possible according to the present invention. For example, one embodiment of a shoe 185 that incorporates an impact and/or vibration absorbent material 190 of the present invention is shown in FIG. 9a. This particular shoe 185 is designed such that an impact and/or vibration absorbent material 190 of the present invention acts to absorb at least a portion of the impact generated upon contact of a wearer's foot with the ground (or another surface or object). As shown, an amount of impact and/or vibration absorbent material 190 is present in the sole 195 of the shoe 185. However, it is also possible to employ an insole 200 that is comprised in whole, or in part, of impact and/or vibration absorbent material. The insole 200 may be used in conjunction with, or in place of, the impact and/or vibration absorbent sole 195.

Figure 10:
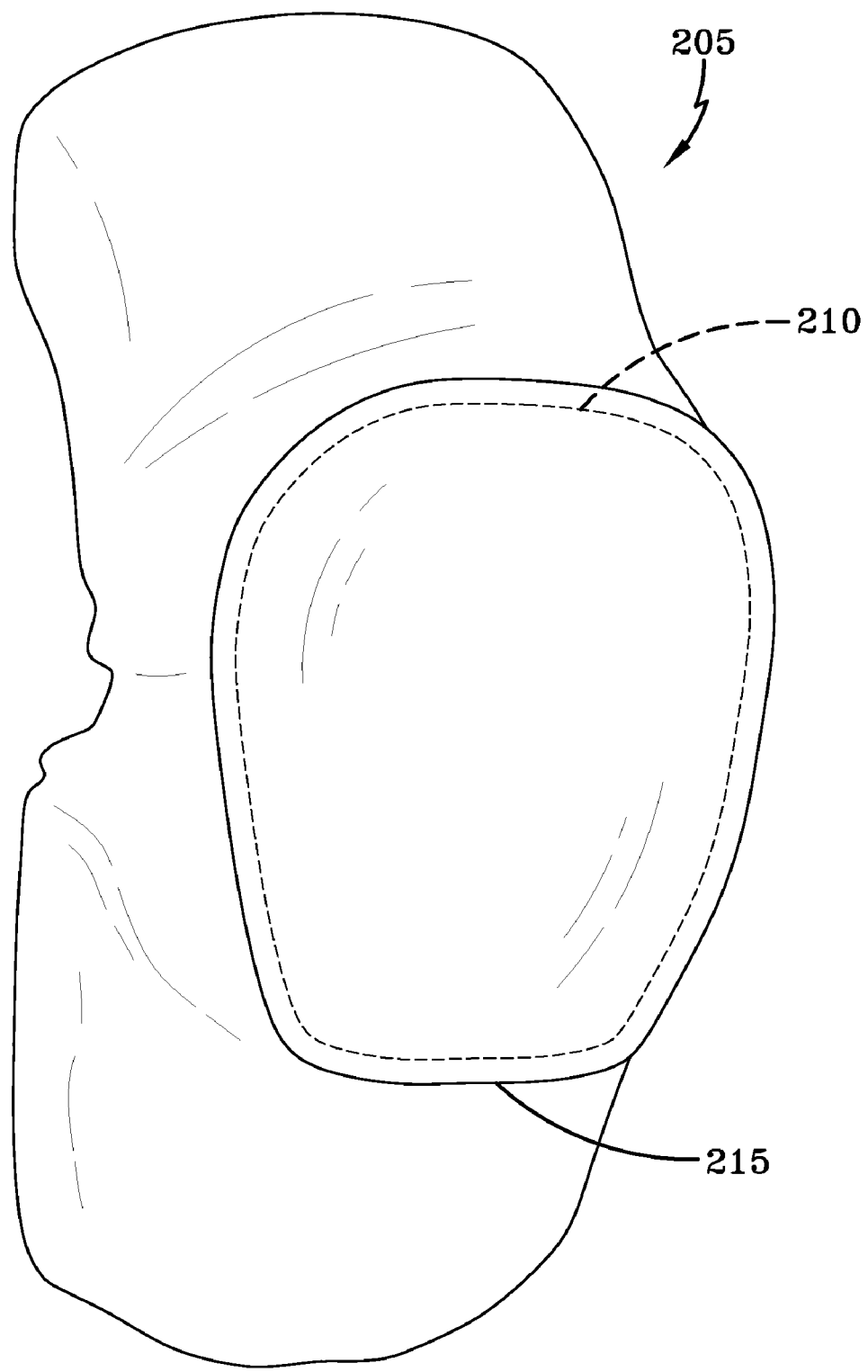
FIG. 10 shows an elbow pad incorporating an impact and/or vibration absorbent material of the present invention.
Figure 11:
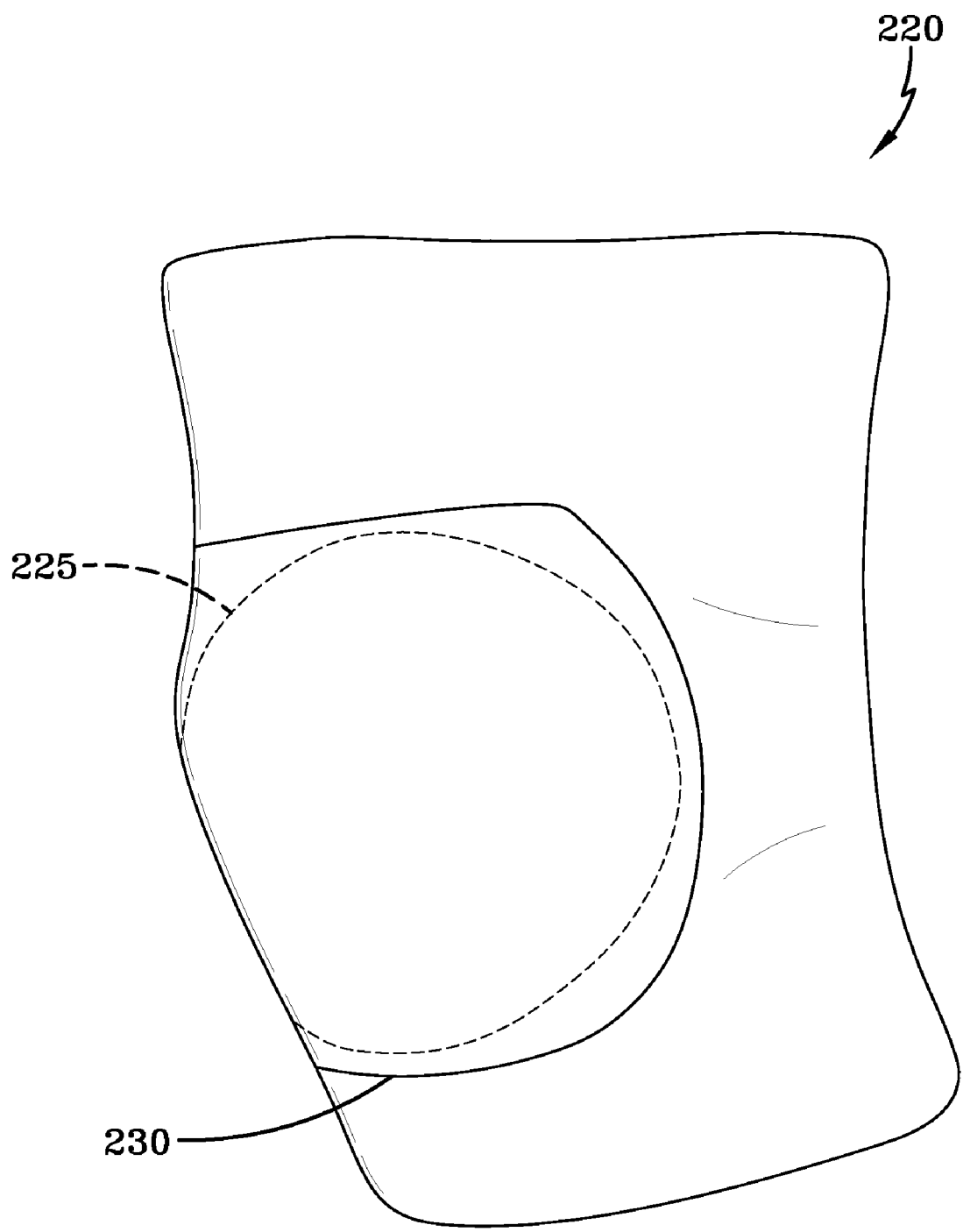
FIG. 11 depicts a knee pad incorporating an impact and/or vibration absorbent material of the present invention.

An exemplary elbow pad 205 and knee pad 220 are depicted in FIGS. 10 and 11, respectively. An elbow and/or knee pad of the present invention may be of various shape, size and design, and may be generally constructed from a number of materials. However, at least one section of impact and/or vibration absorbent material 210, 225 is present and is preferably located so as to most effectively absorb impact upon contact of a wearer's elbow or knee with the ground or another object. As shown, the impact and/or vibration absorbent material 210, 225 may be trapped beneath or within one or more layers of another material, such as a fabric, plastic or rubber material. In the case of the particular elbow pad 205 shown, the impact and/or vibration absorbent material 210 is located under or within a semi-rigid elbow cup 215. In the case of the particular knee pad 220 shown, the impact and/or vibration absorbent material 225 is located within a fabric pocket 230. The impact and/or vibration absorbent material may also be affixed directly to an inside or outside surface of an elbow and/or knee pad.

Figure 12:
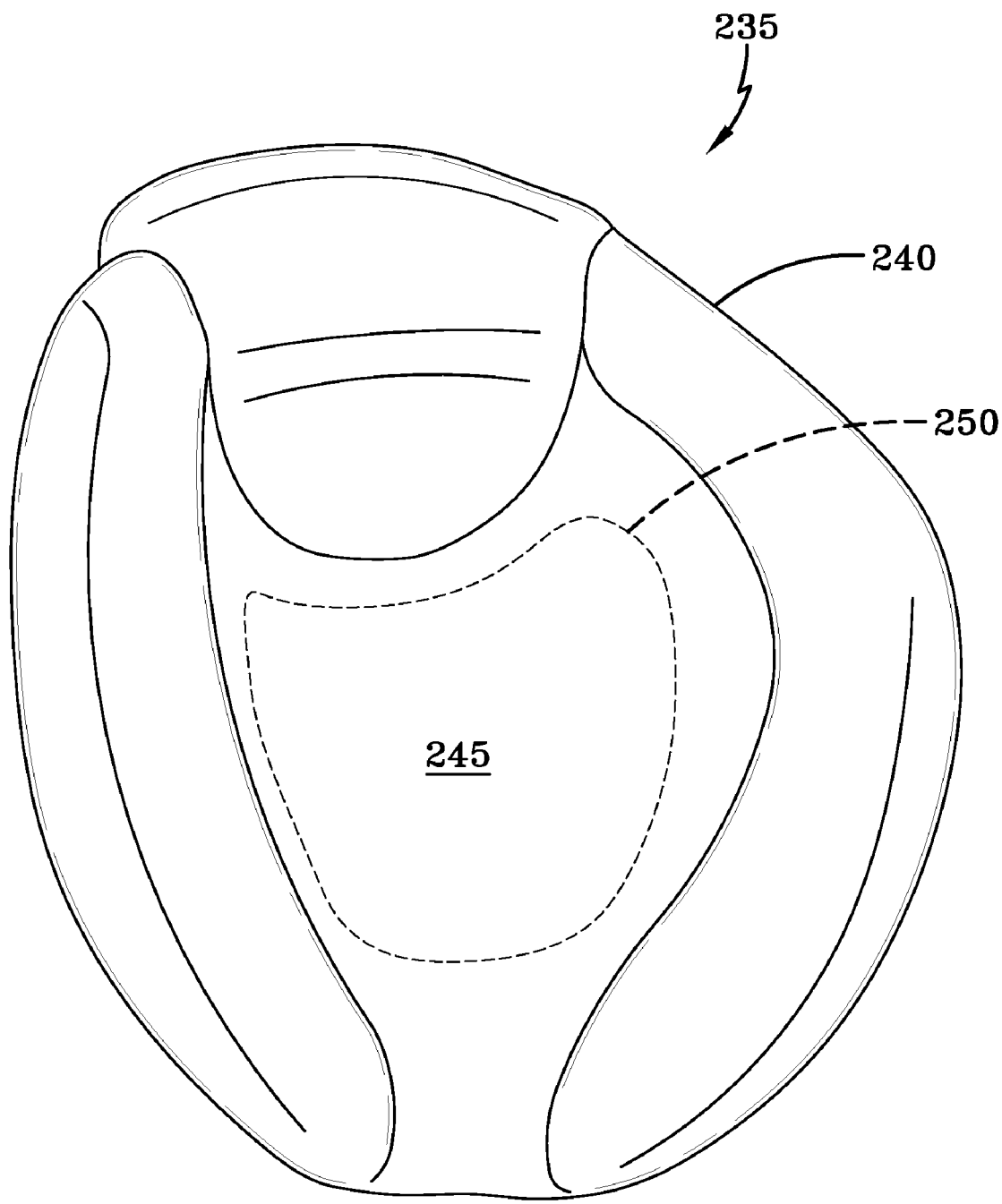
FIG. 12 illustrates a ball glove incorporating an impact and/or vibration absorbent material of the present invention.

FIG. 12 illustrates yet another embodiment of an impact and/or vibration protective article of the present invention—namely, a ball glove 235. The ball glove 235 of FIG. 12 takes the form of a catcher's mitt. However, it should be realized by one skilled in the art that a catcher's mitt is but one representation of such a glove, and the scope of the present invention also encompasses gloves designed for use in virtually any other sport where a participant's hand is subjected to an impact force—whether by a ball, a puck, or otherwise.

As shown, the ball glove 235 includes its familiar leather shell 240, an enlarged periphery of which defines a pocket 245 for catching a ball. As it is within the pocket 245 that the wearer's hand is typically subjected to the greatest impact forces, it is intended that an impact and/or vibration absorbent material 250 of the present invention be located at least within this area of the glove 235. The impact and/or vibration absorbent material 250 may fully or partially cover the pocket 240. The impact and/or vibration absorbent material 250 may also extend to or be present in other areas of the glove 235, such as to more fully cover a wearer's fingers. In other types of ball gloves, the impact and/or vibration absorbent material may be located as needed to best protect the wearer's hand, including the back of the hand.

Figure 13:
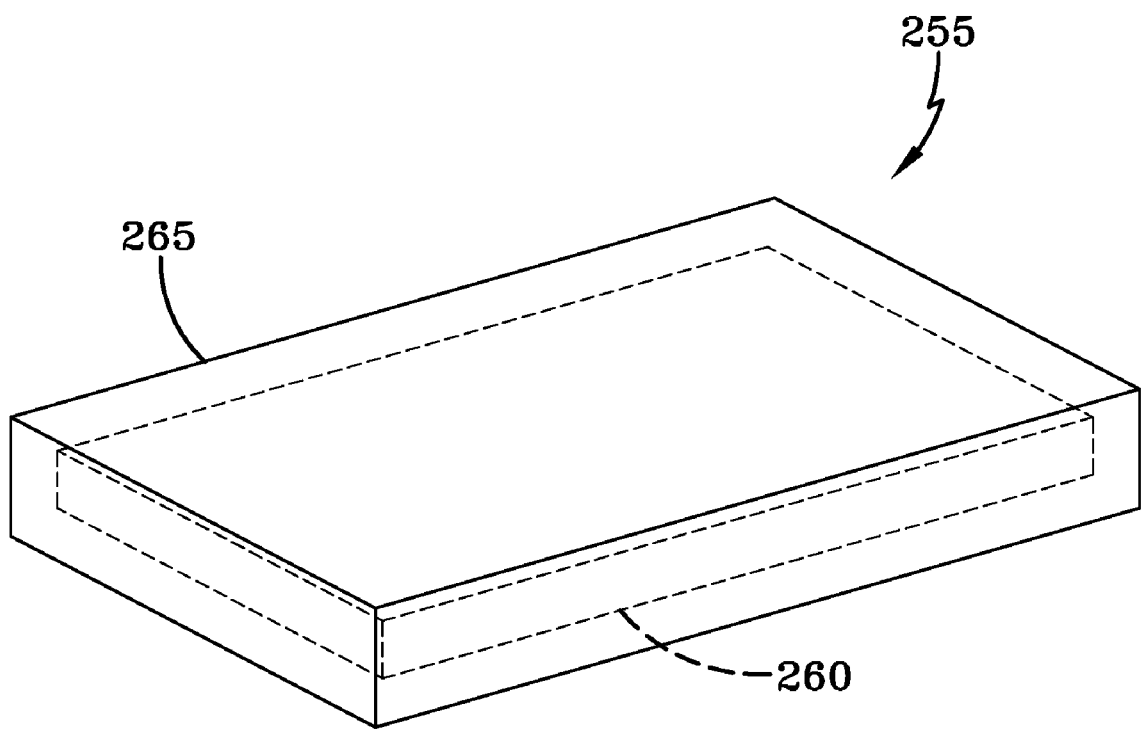
FIG. 13 shows a seat cushion incorporating an impact and/or vibration absorbent material of the present invention.
Figure 14:
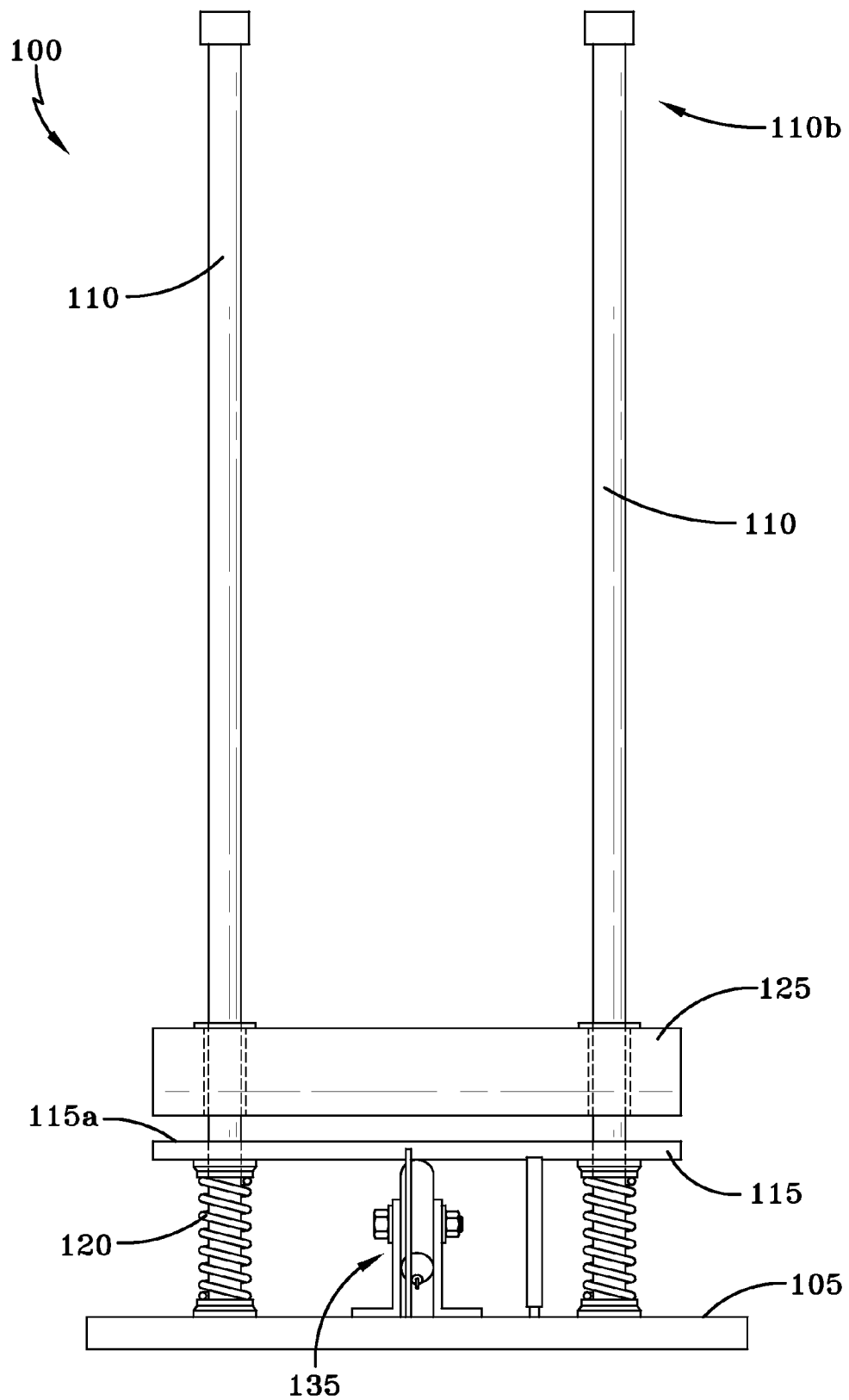
FIG. 14 is a front elevational view of a testing apparatus that is especially well-suited to determining the force absorption characteristics of an impact and/or vibration absorbent material of the present invention.
Figure 15:
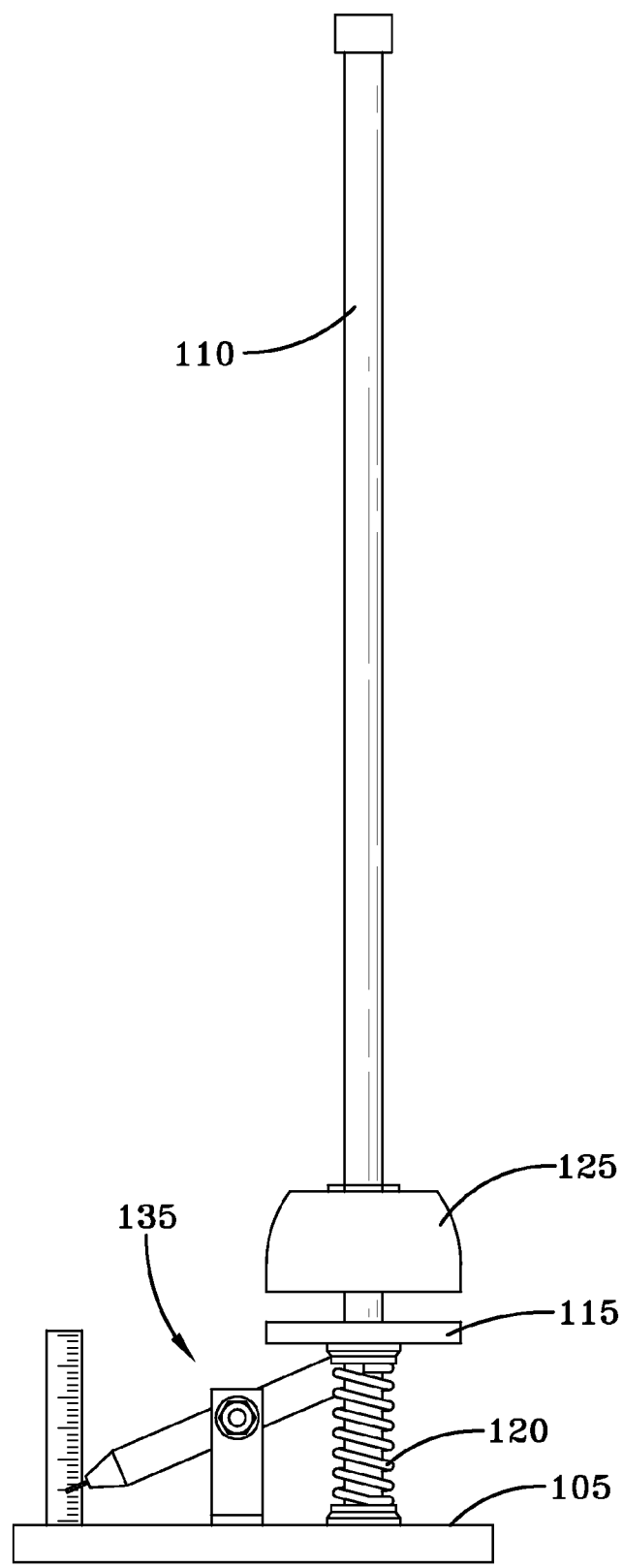
FIG. 15 is a side elevational view of the testing apparatus of FIG. 10.
Figure 16:
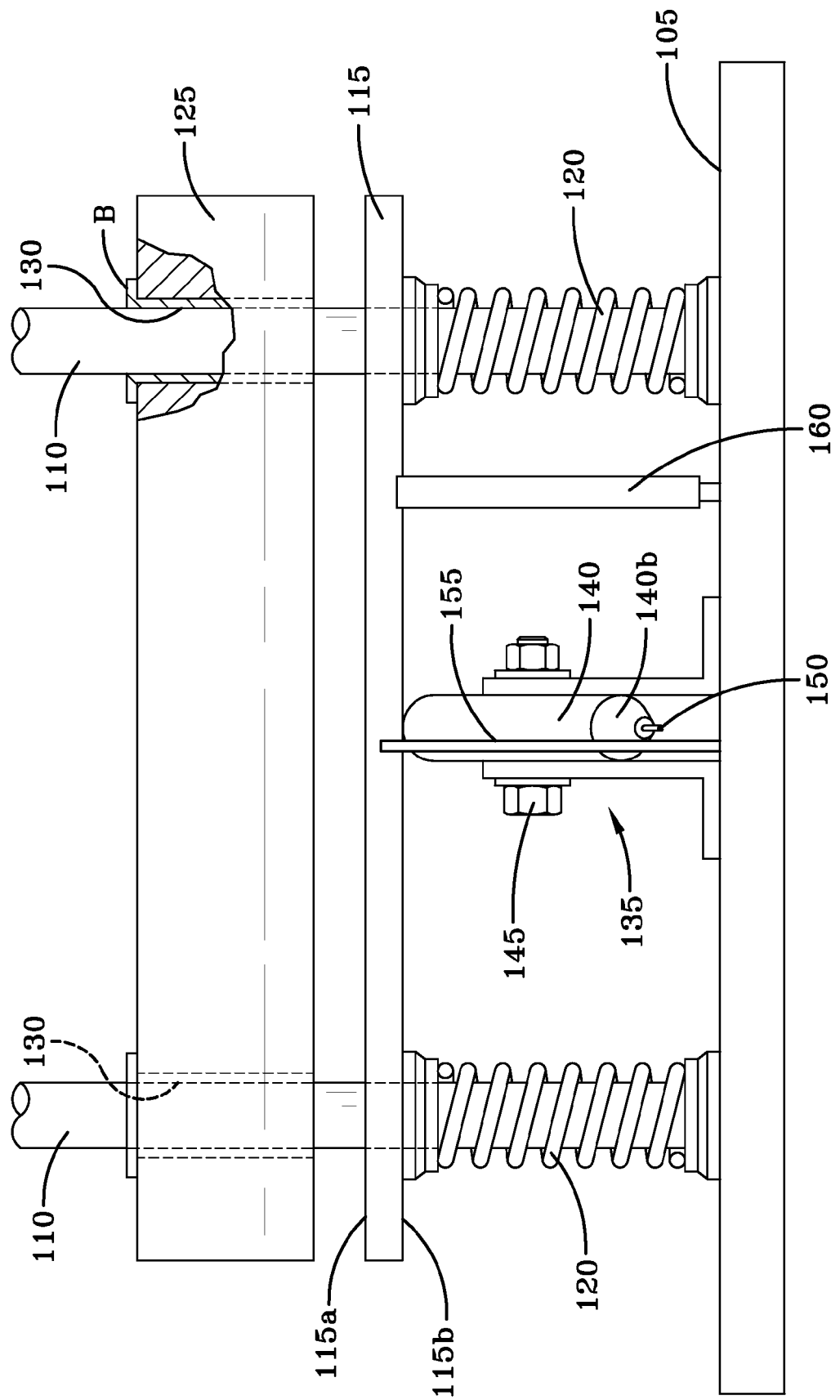
FIG. 16 is an enlarged front elevational view of a base portion of the testing apparatus.
Figure 17:
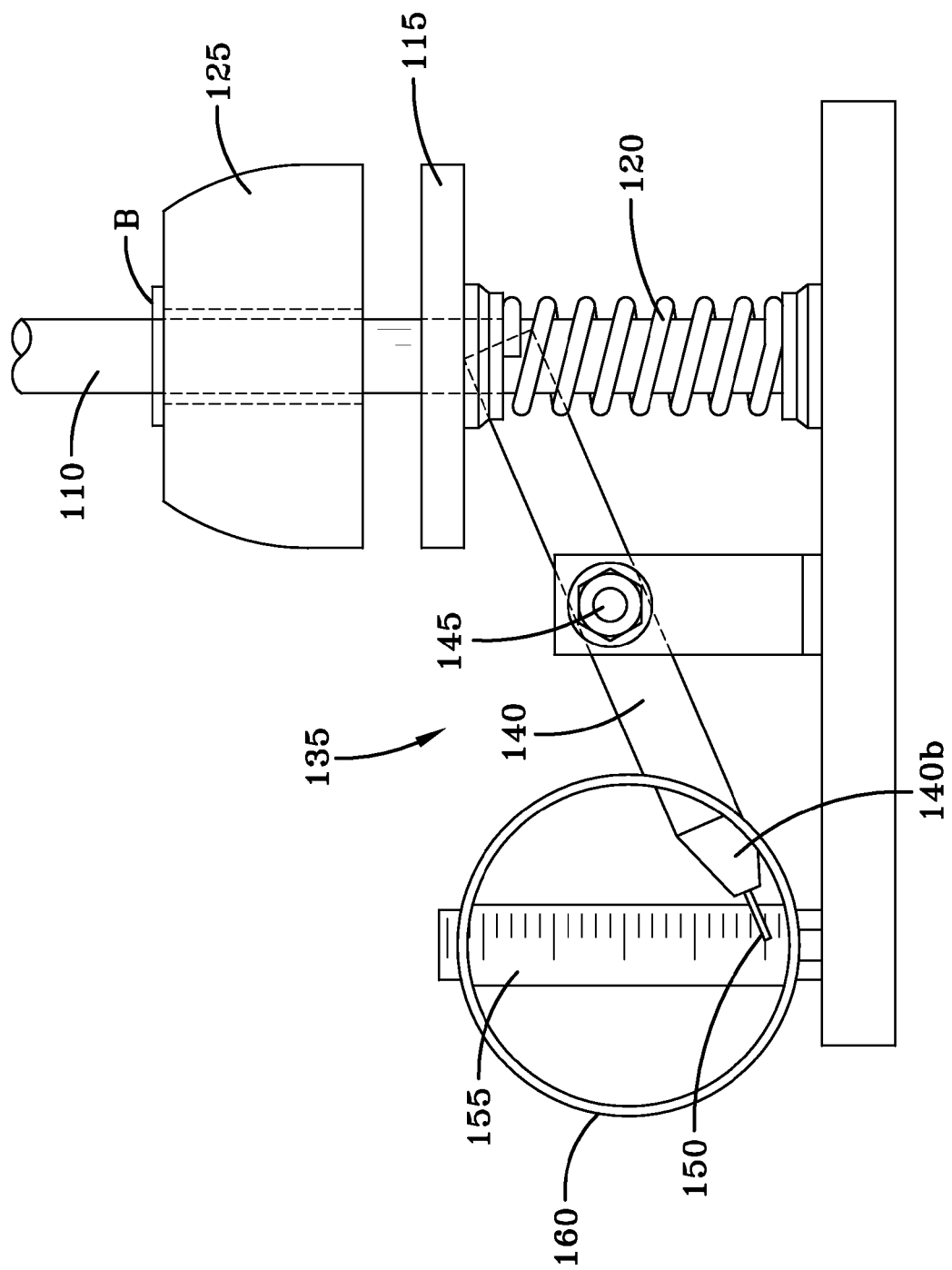
FIG. 17 is an enlarged side elevational view of a base portion of the testing apparatus.

The present invention also contemplates protective devices directed more specifically to vibration-related, rather than impact-related, applications. For example, FIG. 13 shows a seat cushion 255 that incorporates an impact and/or vibration absorbent material 260 of the present invention. Such a seat cushion 255 may be especially useful, for example, to reduce or eliminate the transmission of vibration to a user via the seat of a motorized vehicle. Such vehicles may include, for example, heavy equipment, fork lifts, and other such industrial machinery.

Although it is possible to employ various impact and/or vibration absorbent materials of the present invention in such a seat cushion, it is believed that the impact and/or vibration absorbent material 165 of FIG. 4, or a similar variation thereof, is especially appropriate in such an application. That is, it is believed that such a variation of an impact and/or vibration absorbent material of the present invention provides for increased vibration absorption. Whatever impact and/or vibration absorbent material is selected, it may be used alone or in conjunction with other cushioning materials. The impact and/or vibration absorbent material may be located within a covering 265, such as a vinyl covering, to provide for a particular shape and/or to provide dirt resistance or some other beneficial feature. In an alternative embodiment, the impact and/or vibration absorbent material may form all or a portion of the covering.

The shoe 185, elbow pad 205, knee pad 220, ball glove 235, and seat cushion 255 are described above for the purpose of illustration only, and in no way do these exemplary embodiments limit the scope of the present invention to a particular design. As one skilled in the art would readily understand, there are a multitude of similar designs that would fall within the scope of the present invention. For example, the shoe 185 may be an athletic shoe, a dress shoe, or a work shoe; the elbow and/or knee pads 205, 220 may be designed for use in football, hockey, lacrosse, skating, skate boarding, or any of other various sports, or may be designed for another use altogether, such as an industrial use; the ball glove 235 may be used in baseball, softball, lacrosse, golf, or any of various other sports where it would be desirable to cushion the impact imparted to a wearer's hand by a moving object; and the seat cushion 255 may be designed for recreational use (such as at sporting events), for industrial use (such as on motorized industrial equipment), or for other uses.

It is further intended that a motorcycle glove may be produced using an impact and/or vibration absorbent material of the present invention. A fingerless version of such a glove may look similar to the glove shown in FIG. 5. Although not specifically shown, a motorcycle glove could, of course, also be of fingered style. In any event, such a glove will typically have a body portion (shell) that may be constructed from a wide variety of materials including, for example, leather, vinyl, fabric, various composites, and/or virtually any other material from which gloves are currently manufactured or may be manufactured in the future.

Areas of impact and/or vibration absorbent material may be present at various locations on a motorcycle glove of the present invention, depending on the specific intended use. For example, impact and/or vibration absorbent material may be present along the palm, the front of the fingers, or anywhere along the back of the hand (including the backs of the fingers and knuckles). Additionally, more than one variety of impact and/or vibration absorbent material may be used to impart different properties to different areas of the glove (e.g., more vibration absorption in the palm area).

Any of the aforementioned impact and/or vibration absorbent materials may be manufactured by various methods. For example, an impact and/or vibration absorbent material of the present invention may be manufactured by a molding process, wherein the holes are created by the mold. The mold may also be designed to impart a particular shape or contour to the resulting impact and/or vibration absorbent material, such as might be desirable for use in the glove described above. Alternatively, a sheet of an impact and/or vibration absorbent material layer may be produced by any known means, whereafter the holes can be created by means of a punching or piercing process, for example. In this case, the impact and/or vibration absorbent material layer may already have a molded shape and/or contour, or a shape may be punched or stamped from the sheet of material. In yet another embodiment, holes may be drilled or otherwise bored into suitable material layers. While this method would likely be inefficient, it may allow for co-extrusion of impact and/or vibration absorbent materials of the present invention.

As can be understood from the foregoing, an impact and/or vibration absorbent material of the present invention can be useful in the manufacture of a variety of articles. An impact and/or vibration absorbent material of the present invention can be modified as described to produce the desired results associated with a particular application. An impact and/or vibration absorbent material of the present invention can be constructed from a variety of materials, which materials can be used in substantially any combination. An impact and/or vibration absorbent material of the present invention may be assembled from virtually any number of layers—depending on the application with which the material will be used. Consequently, the present invention is not to be considered limited to the various exemplary impact and/or vibration absorbent materials described above, or to a protective impact glove.

A testing apparatus 100 that is especially well-suited to determining the impact and/or vibration absorbing characteristics of a material of the present invention is illustrated in FIGS. 14-17. In most simplistic terms, it can be seen that the testing apparatus 100 comprises an impact imparting and measuring stand that is designed to deliver an impact force to a material of interest and to determine the amount of the impact force that is absorbed by the material.

The testing apparatus 100 includes a base 105, which may be weighted or otherwise of sufficient mass to maintain the apparatus in a stable position. A pair of guide rods 110 extend upwardly from the base 105. The guide rods 110 are preferably connected at or near their distal ends 110b to ensure a substantially parallel spacing therebetween.

A sample holding plate 115 resides at some distance above the base 105, with the guide rods 110 passing therethrough. The sample holding plate 115 is supported in this elevated position by a plurality of compression springs 120 of known spring rate that extend between the sample holding plate 115 and the base 105. In this particular embodiment of the testing apparatus 100, a compression spring 120 surrounds each of the guide rods 110 in the area between the base 105 and the sample holding plate 115—although such a construction is not essential to operation of the testing apparatus.

A weight 125 of predetermined and known mass is located to be substantially aligned and parallel to the top surface 115a of the sample holding plate 115. The guide rods 110 also pass through the weight 125, and the weight is adapted to slide along the guide rods. If desired, bushings B may be placed within guide rod receiving holes 130 in the weight 125 to facilitate its movement along the length of the guide rods 110.

Located on the base 105 and partially below the sample holding plate 115 is a force absorption indicator mechanism 135. The force absorption indicator mechanism 135 includes an indicator arm 140 mounted to the base 105 by a pivot connection 145. To the indicating end 140b of the indicator arm 140 may be mounted a pointer 150. The opposite end of the indicator arm 140 resides below the sample holding plate 115. The indicator arm 140 may be biased such that in a resting position, the non-indicating end thereof abuts the bottom surface 115b of the sample holding plate 115.

A scale 155 is mounted to the base and located such that the pointer 150 passes in front of the scale when the indicator arm 140 is pivoted. A magnifying glass 160 or similar view enlarging device may also be affixed to the base and located such that movement of the pointer 150 in front of the scale 155 may be better observed therethrough.

In operation, the weight 125 is raised to some predetermined position (height) above the sample holding plate 115. A retaining device may be provided to maintain the weight 125 in the raised position until its release is desired. Once the weight 125 has been raised, a sample of material (not shown) is placed on the sample holding plate 115. With the sample in proper position, the weight 125 is released from its raised position, whereafter it is allowed to fall freely downward along the guide rods 110 and to directly impact the sample of material residing on the sample holding plate 115.

Because the mass of the weight 125, the distance from which the weight falls, and the total spring rate is known, the force absorption properties of a material of interest can be determined. More specifically, when the weight 125 impacts the sample of material, any force passing therethrough also impacts the sample holding plate 115. This impact will cause a compression of the springs 120 and some downward movement of the sample holding plate 115. The downward movement of the sample holding plate 115 causes the indicator arm 140 to pivot about the pivot connection 145, thereby moving the pointer 150 upward away from the base 105. The height to which the pointer 150 rises can be measured by observing the scale 155—preferably through the magnifying glass 160.

As both the total spring rate and the impact force imparted by the weight 225 are known, a given deflection of the sample holding plate 115 can be correlated to a total amount of pass-through impact force. For example, in the particular embodiment of the apparatus shown in FIGS. 14-17, the total spring rate is 688 lb/in. Consequently, each 1/32 inch deflection of the sample holding plate is equivalent to a pass-through impact force of approximately 21.5 lb. (i.e., 0.03125 in.×688 lb/in.) Because the deflection of the sample holding plate 115 will result in an equivalent rise of the pointer 150, the total amount of force passed through the sample of material can be measured by observing the rise of the pointer 150 in front of the scale 155 and multiplying the rise distance by the total spring rate. For example, using the exemplary spring rate of 688 lb/in., a 0.25 in. observable rise of the pointer 150 corresponds to a pass-through impact force of approximately 172 lb.

The amount of impact force absorbed by a particular material sample can then be determined by subtracting the observed/calculated pass-through impact force from the known impact force imparted by the weight 125. The difference between these values will be the amount of impact force absorbed by the sample of material.

The embodiments of the present invention described in detail above have been provided for the purpose of illustration only. However, nothing in the foregoing description is meant to limit the scope of the invention to the particular embodiments described and/or shown. For example, it would be understood by one skilled in the art that various other materials may be acceptably substituted for the exemplary materials described herein. It would be understood by one skilled in the art that an impact and/or vibration absorbent material of the present invention can be used in articles other than a glove, insole and seat cushion. Consequently, while exemplary embodiments of the present invention have been shown and described, the scope of the invention is not to be considered limited by such disclosure, and modifications are possible without departing from the spirit of the invention as evidenced by the following claims:

What is claimed is:

1. An impact and/or vibration protective article comprising:
    an article body; and
    at least one impact and/or vibration absorbent material component for inclusion in or on said article body, said impact and/or vibration absorbent material component further comprising:
        a first layer of a flexible polymeric material, said first layer including a plurality of holes therethrough, and
        a second layer of material assembled to said first layer of flexible polymeric material, said second layer constructed from a material having a hardness greater than the hardness of said first material layer, said second layer including a plurality of holes therein,
    wherein said holes in said first layer are located to be offset from said holes in said second layer when said layers are properly assembled to one another,
    wherein portions of said first layer of material will deflect into said holes in said second layer of material when said impact and/or vibration absorbent material is subjected to an impact force, and
    wherein said at least one impact and/or vibration absorbent material component is located in or on said article body so as to absorb impact and/or vibration forces to which a wearer is exposed when using said impact and/or vibration protective article.

2. The impact and/or vibration protective article of claim 1, wherein said protective article is selected from the group consisting of a shoe, a shoe insole, an elbow pad, a knee pad, a ball glove, a seat cushion, and a motorcycle glove.

3. The impact and/or vibration protective article of claim 1, wherein said article body is constructed from a material selected from the group consisting of leather, vinyl, fabric, composite, and elastomer.

4. The impact and/or vibration protective article of claim 1, wherein said at least one impact and/or vibration absorbent material component is located along an interior portion of said article body.

5. The impact and/or vibration protective article of claim 1, wherein said at least one impact and/or vibration absorbent material component is located between an inner and outer layer of said article body.

6. The impact and/or vibration protective article of claim 1, wherein said at least one impact and/or vibration absorbent material component is located in at least one receiving pocket in or on said article body.

7. The impact and/or vibration protective article of claim 1, wherein said at least one impact and/or vibration absorbent material component is located on an exterior portion of said article body.

8. The impact and/or vibration protective article of claim 1, wherein said at least one impact and/or vibration absorbent material component is coated directly to a surface of said article body.

9. The impact and/or vibration protective article of claim 1, wherein said at least one impact and/or vibration absorbent material component is substantially covered with a stretchable fabric material to facilitate installation thereof to said article body.

10. The impact and/or vibration protective article of claim 1, wherein said at least one impact and/or vibration absorbent material component is provided with a non-uniform pattern of holes so as to selectively impart dissimilar impact and/or vibration absorbing characteristics to particular areas of said protective article.

11. An impact and/or vibration protective article comprising:
    an article body; and
    at least one impact and/or vibration absorbent material component located along an interior portion of said article body to absorb impact and/or vibration forces to which a wearer is exposed when using said impact and/or vibration protective article, said impact and/or vibration absorbent material component further comprising:
        a first layer of a flexible polymeric material, said first layer including a plurality of holes therethrough, and
        a second layer of material assembled to said first layer of flexible polymeric material, said second layer constructed from a material having a hardness greater than the hardness of said first material layer, said second layer including a plurality of holes therein, said holes in said second layer located to be offset from said holes in said first layer when said layers are properly assembled to one another;
    wherein portions of said first layer of material will deflect into said holes in said second layer of material when said impact and/or vibration absorbent material is subjected to an impact force.

12. The impact and/or vibration protective article of claim 11, wherein said protective article is selected from the group consisting of a shoe, a shoe insole, an elbow pad, a knee pad, a ball glove, a seat cushion, and a motorcycle glove.

13. The impact and/or vibration protective article of claim 11, wherein said article body is constructed from a material selected from the group consisting of leather, vinyl, fabric, composite, and elastomer.

14. The impact and/or vibration protective article of claim 11, wherein said at least one impact and/or vibration absorbent material component is located in at least one receiving pocket in or on said article body.

15. The impact and/or vibration protective article of claim 11, wherein said at least one impact and/or vibration absorbent material component is coated directly to a surface of said article body.

16. An impact and/or vibration protective article comprising:
    an article body; and
    at least one impact and/or vibration absorbent material component located between an inner and outer layer of said article body to absorb impact and/or vibration forces to which a wearer is exposed when using said impact and/or vibration protective article, said impact and/or vibration absorbent material component further comprising:
        a first layer of a flexible polymeric material, said first layer including a plurality of holes therethrough, and
        a second layer of material assembled to said first layer of flexible polymeric material, said second layer constructed from a material having a hardness greater than the hardness of said first material layer, said second layer including a plurality of holes therein, said holes in said second layer located to be offset from said holes in said first layer when said layers are properly assembled to one another;
    wherein portions of said first layer of material will deflect into said holes in said second layer of material when said impact and/or vibration absorbent material is subjected to an impact force.

17. The impact and/or vibration protective article of claim 16, wherein said protective article is selected from the group consisting of a shoe, a shoe insole, an elbow pad, a knee pad, a ball glove, a seat cushion, and a motorcycle glove.

18. The impact and/or vibration protective article of claim 16, wherein said article body is constructed from a material selected from the group consisting of leather, vinyl, fabric, composite, and elastomer.

19. The impact and/or vibration protective article of claim 16, wherein said at least one impact and/or vibration absorbent material component is located in at least one receiving pocket in or on said article body.

20. The impact and/or vibration protective article of claim 16, wherein said at least one impact and/or vibration absorbent material component is substantially covered with a stretchable fabric material to facilitate installation thereof to said article body.

* * * * *